United States Patent [19]

Mathews, deceased et al.

[11] Patent Number: 4,512,141
[45] Date of Patent: Apr. 23, 1985

[54] DRUM MOWERS HAVING SPRING MOUNTED FLAT BLADES

[76] Inventors: Bernard C. Mathews, deceased, late of Crystal Lake, Ill.; by Violet E. Mathews, administrator, 8606 Rte. 176, Crystal Lake, Ill. 60014

[21] Appl. No.: 526,689

[22] Filed: Aug. 26, 1983

[51] Int. Cl.³ ............................................ A01D 55/18
[52] U.S. Cl. ........................................ 56/13.6; 56/295
[58] Field of Search ............... 56/6, 13.6, 12.7, 192, 56/295; 30/276

[56] References Cited

U.S. PATENT DOCUMENTS

| | | | |
|---|---|---|---|
| 2,697,323 | 12/1954 | Horn | 56/12.7 |
| 3,010,269 | 11/1961 | Maguire | 56/295 |
| 3,086,346 | 4/1963 | Zimmermann | 56/295 |
| 3,918,241 | 11/1975 | Stilliams | 56/12.7 |
| 3,958,402 | 5/1976 | Bouet | 56/295 |
| 4,292,790 | 10/1981 | Mathews | 56/13.6 |

FOREIGN PATENT DOCUMENTS 2061687  5/1981  United Kingdom ................ 56/295

*Primary Examiner*—Gene Mancene
*Assistant Examiner*—John G. Weiss
*Attorney, Agent, or Firm*—Thomas W. Speckman

[57] ABSTRACT

Drum mowers having flat L-shaped blades in which the vertical portions are spring mounted relative to the rotating drums of drum mowers are disclosed having a spring mounting providing yielding of the horizontal portion of the blade in both a vertical and horizontal direction when it strikes an obstruction and automatic return of the blade to its mowing position. The flat blades provide greater strength and less vertical obstruction than prior blades. In a preferred embodiment, the end cutting portions of the blades attached to adjacent drums of multiple drum mowers do not overlap adjacent discs and are twisted with respect to the flat horizontal portion so the sharpened leading edge is downward.

20 Claims, 6 Drawing Figures

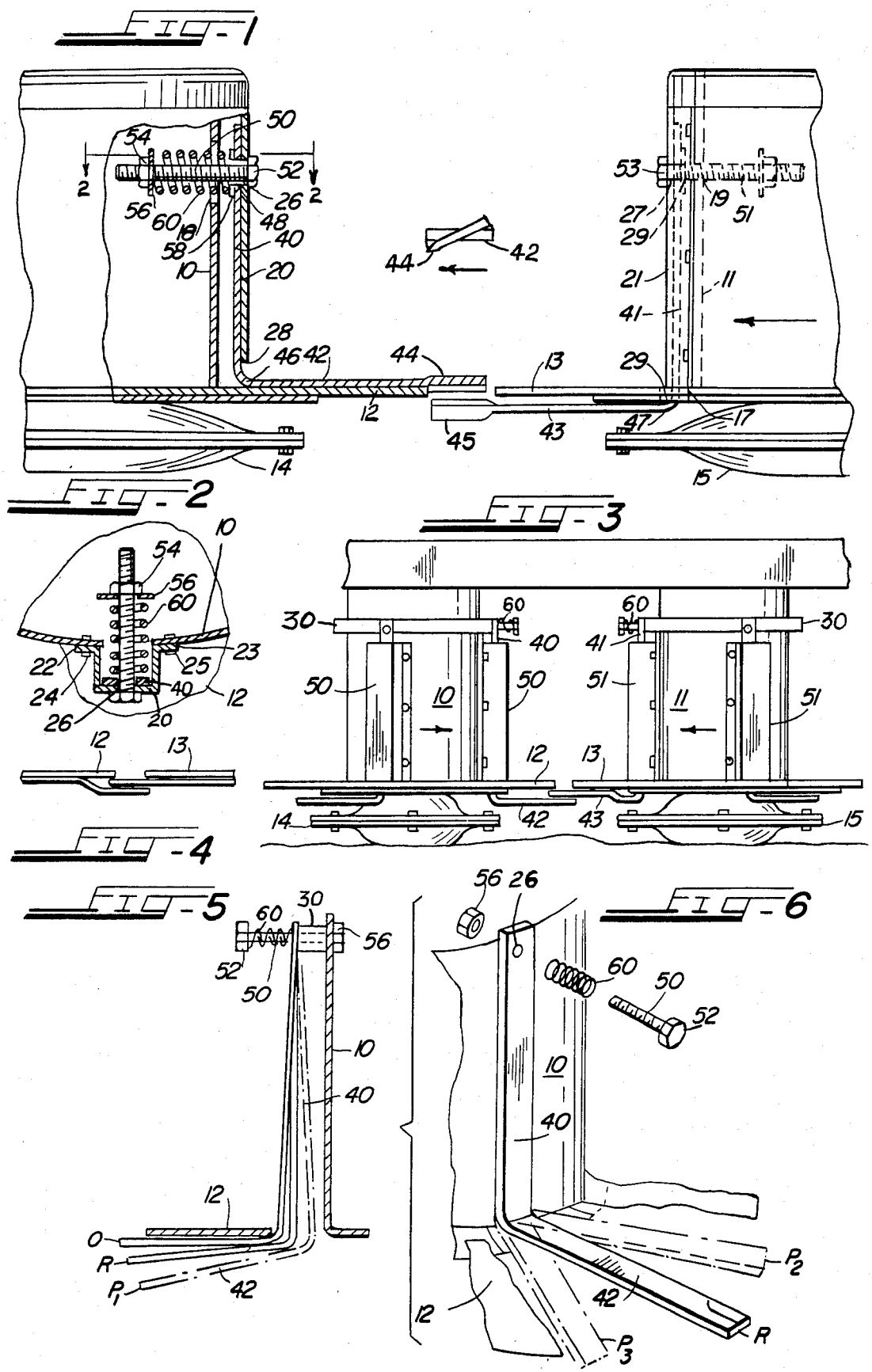

DRUM MOWERS HAVING SPRING MOUNTED FLAT BLADES

BACKGROUND OF THE INVENTION

1. Field of the Invention

This invention relates to drum-type mowers providing effective cutting and windrowing of the cut crop, such as hay. The drum mowers have one or more generally vertically disposed rotating drums with the bottom of each being equipped with a relatively large diameter disc. Cutting blades rotate with the drum and disc and may be located either above or below the discs. In multiple drum mowers, the drums cooperate in pairs rotating in opposite directions to deliver the cut grass or hay rearwardly of the mower by the action of the cooperative pair of rotating drums and discs. This is especially important when crop conditioners are used in conjunction with the mowers. More particularly, the present invention relates to the use of flat L-shaped blades the vertical portions of which are spring mounted, relative to the drum, permitting yielding of the horizontal portion in a rotary direction or in a vertical direction upon striking of an obstruction and providing automatic return to its desired position. The flat blade structure inhibits torsional twisting in the blade itself while providing yielding of the blade due to the spring mounting. The flat blade structure has reduced vertical structure thereby reducing striking of foreign objects and reducing catching or jamming with cut agricultural products.

2. Description of the Prior Art

A wide variety of drum-type mowers with radially projecting cutting blades have been known to the art as exemplified by U.S. Pat. Nos. 3,389,539; 3,391,522; 3,443,369; 3,550,360; 3,735,572 and my own prior U.S. Pat. Nos. 4,160,356 and 4,292,790. Federal Republic of Germany Patent Publication No. 2,444,610 teaches horizontally swingable blades.

My own prior U.S. Pat. No. 4,292,789 teaches L-shaped spring wire blades for use on multiple drum-type mowers wherein the vertical portion of the spring wire blade provides a torsional twist yielding when the horizontal leg strikes and obstruction. The only movement of the horizontal portion of the blade taught by my U.S. Pat. No. 4,292,789 arises from flexing action or torsional action in the vertical portion of the L-shaped spring wire blade. The U.S. Pat. No. 4,292,789 teaches that the L-shaped blades are fixedly held to the drum at the top of the blade. Federal Republic of Germany Patent Publication No. 2,422,651 teaches L-shaped blades having their vertical portions locked in place.

SUMMARY OF THE INVENTION

An important aspect of the present invention is provision of flat L-shaped blades in which the vertical portions are spring mounted relative to the rotating drums of drum mowers. The flat steel stock of both the vertical and horizontal portion of the L-shaped blades of the present invention provides much stronger blades than the previously used L-shaped spring wire blades. Yielding of the horizontal portion of the blade when it strikes an obstruction is provided by the spring mounting of the vertical portion of the blade relative to the drum.

The flat L-shaped blade as used in the drum mowers of this invention may be mounted so that the horizontal portion of the blade is either above or below the disc associated with the rotating drum to which the blade is mounted. In either case, the flat blade provides a much less prominent structure beneath the disc for engagement with uneven ground or a rock and provides a much flatter structure on top of the disc for less collection and interference with cut grass. The flat horizontal portions of the blades according to the present invention may "hug" either the top or the bottom of the disc in a much closer relation than the L-shaped blades taught by the U.S. Pat. No. 4,292,789 which require torsional twisting ability in the vertical portion, and thus are normally made out of round stock. The flat blades used in the drum mowers of this invention are at least about 3/16 inch thick and have a ratio of width to thickness in the order of 3 to 8, preferably about 5 to 7 and thus provide essentially no torsional twisting, the blade movement resulting from spring flexing.

Further, the flat L-shaped blades, in preferred embodiments of the present invention, may be entirely mounted and contained within tunnels along the vertical exterior of the drums thereby providing minimal exposure for collecting cut grasses and foreign objects.

These advantages are achieved by spring mounting the upper region of the vertical leg of the flat L-shaped blade in relation to the rotatable drum by mounting to the drum itself, or to a ring around the rotatable drum, or to the interior portion of a vertical tunnel attached to the drum. The blade mounting means includes an elongated portion extending through an oversized hole in the vertical portion of the blade with an enlarged spring retaining portion at one end and an attachment portion at the other end. A coil-type spring of suitable strength to permit movement of the horizontal portion of the blade upon application of a force to that portion of the blade is mounted around the shaft of the mounting means in force transmitting relationship at one end against the vertical portion of the flat blade. So mounted, the outboard end of the horizontal portion of the flat blade may readily move throughout an arc of about 20° to 45° and automatically return, due to force of the spring, to its original position when the force causing the movement is removed. Likewise, the outboard end of the horizontal portion of the blade may move upwardly or downwardly in a vertical direction an amount permitted by the inhibiting structure of the apparatus and also automatically return, due to force of the spring, to its original position when the force causing the movement is removed.

An object of this invention is to provide a flat L-shaped blade for drum mowers in which the vertical portion of the flat blade is spring mounted to provide arcuate yielding of the blade when striking an obstruction by flexing of the spring and automatic return of the blade to its cutting position by force of the spring.

Another object of this invention is to provide a flat L-shaped blade for drum type mowers in which the horizontal portion of the blade may be vertically deflected by a force applied to it by flexing of the spring and automatic return of the blade to its cutting position by force of the spring.

Still another object of this invention is to provide L-shaped blades for drum mowers which provide longer lifetimes due to reduced fatigue in the blade structure itself resulting from striking rocks, ground irregularities, and the like.

Yet another object of this invention is to provide L-shaped blades for drum mowers having reduced exposure for striking obstructions and reduced exposure for collecting or interfering with the mowed crop.

BRIEF DESCRIPTION OF THE DRAWINGS

The above and other advantages of this invention will be apparent from the following detailed disclosure and reference to the drawings showing preferred embodiments wherein:

FIG. 1 is a front view of a portion of two cooperative mower drums shown in partial section having spring mounted flat blades in accordance with one embodiment of this invention;

FIG. 2 is a top sectional view through the section of FIG. 1 indicated as 2—2;

FIG. 3 is a front view showing two cooperative mower drums having spring mounted flat blades according to another embodiment of this invention;

FIG. 4 shows another embodiment of the flat blades of this invention in their overlapping region;

FIG. 5 schematically shows the vertical movement of the horizontal portion of the flat blade of one embodiment of this invention which is returned to its original position by the spring mounting means; and FIG. 6 schematically shows the horizontal arcuate movement of the horizontal portion of the flat blade of one embodiment of this invention which is returned to its original position by the spring mounting means.

DESCRIPTION OF PREFERRED EMBODIMENTS

Referring to the figures, FIG. 1 shows portions of two adjacent generally vertically disposed rotatable drums 10 and 11 with larger diameter generally horizontally disposed discs 12 and 13 at their bottom, respectively. Beneath the discs ground engaging skids 14 and 15 are shown. The rotatable drums each have a plurality of L-shaped blades with a horizontal cutting portion extending radially beyond the disc. A suitable drum mower comprising such generally vertically disposed rotatable drums together with their drive means are taught by my prior U.S. Pat. Nos. 4,160,356, 4,292,789, and 4,292,790. The features of this invention, however, are not limited to the specific mowers taught by my prior patents, but are applicable to all crop mowers having generally vertically disposed rotatable drums with larger diameter horizontally disposed discs at their bottoms. Such mowers with multiple drums operate by adjacent cooperative drums rotating in the direction indicated by the arrows on the drawings in which the agricultural crop, such as hay to be harvested, is cut by the generally horizontal cutting blades, the cut hay falling onto the top surfaces of the discs and the cooperative rotation of these discs causing the hay to be delivered rearwardly for further conditioning or collection.

My prior U.S. Pat. No. 4,292,789 teaches mowers of the above described type having L-shaped spring wire blades with the upper ends of the vertical leg portions fixedly fastened to the drum near its upper end with the horizontal portion of the blade projecting radially outwardly beyond the disc for cutting wherein the spring wire horizontal blade can yield rearwardly about its vertical leg as an axis of torsional twist when the horizontal leg strikes an obstruction. The striking of rocks or mounds of earth and uneven fields is a severe problem with mowers of this type resulting in more than desired blade breakage.

The present invention relates to drum mowers wherein the L-shaped blades comprise a flat vertical portion and a flat horizontal portion, the flat vertical portion being attached in relation to the drum by spring mounting means extending through an oversized hole in the flat vertical portion permitting movement of the blade by spring flexure. The spring mounting means is maintained in force transmitting relation to the flat vertical portion whereby horizontal application of force to the flat horizontal portion of the blade causes the spring means to flex providing arcuate yielding of the flat horizontal portion and automatic return of the blade to its desired cutting position by force of the spring. Likewise, vertical application of force to the flat horizontal portion of the blade of this invention causes the spring means to flex providing vertical yielding of the flat horizontal portion and automatic return to its cutting position by force of the spring. By flat L-shaped blades, I mean blades at least about ⅛ inch thick and having a ratio of width to thickness of about 3 to 8 and preferably flat L-shaped blades which are about 3/16 to ¼ inch thick and have a ratio of width to thickness of about 5 to 7. The flat L-shaped blades of this invention provide a much stronger blade with the spring mounting means providing both arcuate and vertical yield to the horizontal portion of the blade, overcoming fatigue which may arise in the torsional twisting of prior blades. It is preferred that the blades be made from flat steel stock such as 1045 to 1065 high carbon steel, such as 3/16 inch thick by 1¼ inch wide stock which may be bent at approximately 90° and sharpened to a sharpened cutting edge at the outer extremity of the horizontal portion. The horizontal portion must be of length to extend beyond the disc, to provide overlap of the path of blades associated with an adjacent rotating disc, and extend back to the vicinity of the drum to which it is attached. The height of the vertical portion is not important, but in practice has been a major portion of the height of the drum. The blades may be heat treated as desired following bending.

The flat horizontal portion of the blade has particular importance to the invention as seen in FIGS. 1, 3, and 4 showing the closeness of operation of the flat blade to the rotatable disc. For example, in FIG. 1, the horizontal portion 42 of the blade adjacent the upper side of disc 12 may be directly in contact with the disc and in such case it is preferred that the sharpened edge portion 44 extends beyond the outer edge of disc 12 but does not overlap adjacent disc 13. In a preferred embodiment as shown in FIG. 1 and the end view insert, the end portion 44 of horizontal portion 42 is twisted with its leading sharpened edge downward. The arrow in the blade end view shows the direction of blade travel. Twisting in an amount of about 5 to about 30 degrees is suitable, about 10 to about 25 degrees being preferred. Likewise in FIG. 1 it is seen that horizontal portion 43 located below disc 13 hugs the bottom of the disc quite closely and in fact may be formed to be directly adjacent the bottom of disc 13 as shown in FIG. 3. End portion 45 of horizontal portion 43 may be twisted in the same manner as described with respect to end portion 44. When the blades of adjacent discs are located beneath the discs, they may have a configuration as shown in FIGS. 3 and 4 to be as close as possible to the bottom of the discs. This closeness is made possible by the flat shape of the horizontal portion of the blades requiring less vertical space and clearance than formerly used round blades.

Referring specifically to FIGS. 1 and 2, drum 10 has vertically disposed U-shaped tunnel 20 with outwardly extending mounting flanges 22 and 23 for attachment to drum 10 by mounting bolts 24 and 25. Tunnel blade mounting hole 26 is provided in alignment with blade mounting hole 48. Blade vertical portion 40 is shown adjacent the inside portion of tunnel 20 with blade transition portion 46 located beneath tunnel bottom end 28 and blade horizontal portion 42 extending outward radially adjacent the top of disc 12 beyond the edge of adjacent disc 13.

The spring mounting means extends through oversized mounting hole 48 in blade vertical portion 40 and comprises spring means 60 in force transmitting relation to the flat vertical portion of the blade whereby horizontal application of force to flat horizontal portion 42 of the blade causes spring means 60 to flex providing arcuate yielding of the flat horizontal portion and automatic return by the force of spring 60 to its cutting position. This is diagrammatically shown in FIG. 6 wherein blade horizontal portion 42 is shown in rest position, or cutting position, R and by application of horizontal force may yield arcuately to either postion $P_2$ or $P_3$ and return to position R by force of spring 60. Likewise, as shown diagrammatically in FIG. 5, vertical application of force to flat blade horizontal portion 42 causes spring means 60 to flex providing vertical yielding of the flat horizontal portion from rest position R to position $P_1$ or position 0 and following removal of the vertical force spring means 60 automatically returns flat blade horizontal portion 42 to operating position 0 or rest position R depending upon whether the drum is rotating. As explained in my prior U.S. Pat. No. 4,292,789, the blades may, by centrifual force of high speed rotation of the drums, be forced from rest position R to operating position 0.

As shown in FIGS. 1-2, the spring mounting means has elongated shaft portion 50 extending through oversized mounting hole 48 in blade vertical portion and extending through spring mounting means hole 18 in drum 10 which is sufficiently large to prevent engagement with spring 60. Spring 60 is a suitable coil spring encircling shaft portion 50 and in force transmitting relation to the blade flat vertical portion 40 at one end in force transmitting relation to spring retaining portion 54, shown as a nut on threaded shaft 50, at the other end. Washers 56 and 58 may be provided at each end of the spring as desired. By this manner of spring mounting, it is readily seen that blade vertical portion 40 may be moved to allow both horizontal arcuate movement and vertical movement of blade horizontal portion 42. It is preferred to use a machine screw for providing shaft 50 to afford adjustment of spring tension by tightening or loosening of nut 54. It should, however, be readily apparent that the spring mounting means assembly may be any elongated shaft about which the coil spring may provide force for automatically returning blade vertical portion 40 to a predetermined position. This position, in the case of the embodiment shown in FIGS. 1 and 2, is determined by the inside of tunnel 20. While it is shown in the figures that the spring mounting means is located in the upper region of the flat blade vertical portion, this is not critical and the spring mounting means may be located at any position in the flat blade vertical position. A further advantage of the embodiment shown in FIGS. 1 and 2 is the freedom of any intefering extension beyond the outside surface of the drum or tunnel to catch cut hay or grass.

Yet another advantage of the embodiment shown in FIGS. 1 and 2 is the provision of an assembly of the flat L-shaped blade, spring mounting means, and tunnel which may be attached to and removed from the drum simply by removal and replacement of mounting bolts 24 and 25, providing easy replacement of the blades. The blades may be readily replaced in this assembled fashion regardless of whether the horizontal portion of the blades are located above or beneath the discs. For example, the blade horizontal portion 43 attached to drum 11 is readily removed and replaced beneath disc 13 by insertion through blade hole 17.

FIGS. 3, 5 and 6 show another embodiment whereby the blade vertical portions 40 and 41 may be attached either directly to drum 10 or 11, or to a ring 30 extending outwardly from the drum. FIGS. 3 and 5 show the flat blade vertical portions 40 and 41 attached to ring 30 extending outwardly from drum 10. FIG. 6 schematically shows flat blade vertical portion 40 attached directly to drum 10, which embodiment will limit the vertically downward motion possible in flat blade horizontal portion 42. In these embodiments, the spring means operates in the same force transmitting relation to the flat vertical portion of the knife as explained above. In the embodiments shown in FIGS. 3, 5 and 6, spring 60 extends between mounting shaft head 52 and blade vertical portion 40 with mounting shaft 50 extending through oversized blade mounting hole 26 and secured by nut 56 on the interior of drum 10.

While in the foregoing specification this invention has been described in relation to certain preferred embodiments thereof, and many details have been set forth for purpose of illustration, it will be apparent to those skilled in that art that the invention is susceptible to additional embodiments and that certain of the details described herein can be varied considerably without departing from the basic principles of the invention.

I claim:

1. In a drum mower comprising at least one generally vertically disposed rotatable drum, said drum having a larger diameter generally horizontally disposed disc at its bottom, and said drum having a plurality of L-shaped blades, the vertical portion of each said blade attached in relation to said drum and the horizontal portion of each said blade positioned in close relation to one side of said disc and extending radially therebeyond, the improvement comprising: said L-shaped blades comprising a flat vertical portion and a flat horizontal portion, said flat vertical portion attached in relation to said drum by spring mounting means extending through an oversize hole in said flat vertical portion, and comprising spring means in force transmitting relation to said flat vertical portion whereby horizontal application of force to said flat horizontal portion causes said spring means to flex providing arcuate yielding of said flat horizontal portion and automatic return to its cutting position and whereby vertical application of force to said flat horizontal portion causes said spring means to flex providing vertical yielding of said flat horizontal portion and automatic return to its cutting position.

2. The improved drum mower of claim 1 wherein said flat L-shaped blades are at least ⅛ inch thick and have a ratio of width to thickness of about 3 to 8.

3. The improved drum mower of claim 1 wherein said flat L-shaped blades are about 3/16 to about ⅜ inch thick and have a ratio of width to thickness of about 5 to 7.

4. The improved drum mower of claim 1 wherein said spring mounting means comprises; an elongated shaft portion extending through said oversized hole in and extending beyond said flat vertical portion of said blade, a coil spring encircling said shaft portion in force transmitting relation to said flat vertical portion of said blade at one end and in force transmitting relation to an enlarged spring retaining portion affixed to said shaft at the other end.

5. The improved drum mower of claim 4 wherein said mounting means comprises a machine bolt having an at least partially threaded shaft, an enlarged head portion at one end and an enlarged nut threaded on the other end and a coil spring encircling said shaft in force transmitting relation to said flat vertical portion of said blade at one end and in force transmitting relation to said enlarged head at the other end.

6. The improved drum mower of claim 1 wherein said mounting means comprises a machine bolt having an at least partially threaded shaft, an enlarged head portion at one end and an enlarged nut threaded on the other end, and a coil spring encircling said shaft in force transmitting relation to said flat vertical portion of said blade at one end and in force transmitting relation to said enlarged nut at the other end.

7. The improved drum mower of claim 1 having multiple drums wherein said flat horizontal portions of said L-shaped blades are closely adjacent the upper surface of said disc of one drum and said flat horizontal portions of said L-shaped blades are closely adjacent the lower surface of the disc of a second adjacent cooperating drum.

8. The improved drum mower of claim 7 wherein the ends of said flat horizontal portions of said L-shaped blades are not in overlapping relation to adjacent discs.

9. The improved drum mower of claim 8 wherein the end portions of said flat horizontal portions of said L-shaped blades are twisted with a sharpened leading edge downward, said end portions twisted about 5 to about 30 degrees relative to said horizontal portions.

10. The improved drum mower of claim 1 wherein said L-shaped blades are attached by said spring mounting means to the interior of vertically extending tunnels removably attached to the exterior of said drum.

11. The improved drum mower of claim 10 wherein said mounting means comprises a machine bolt having an at least partially threaded shaft, an enlarged head portion at one end and an enlarged nut threaded on the other end, and a coil spring encircling said shaft in force transmitting relation to said flat vertical portion of said blade at one end and in force transmitting relation to said enlarged nut at the other end, said shaft extending inwardly through a hole in said tunnel and an oversized hole in said drum, said enlarged head portion being on the exterior of said tunnel and said spring urging said flat vertical portion of said blade against the interior of said tunnel.

12. The improved drum mower of claim 11 wherein said tunnel is secured to said drum by bolt means, said tunnel and attached blade being removable from said mower as a single unit.

13. The improved drum mower of claim 1 wherein said blades are attached by said spring mounting means to the exterior of said drum.

14. The improved drum mower of claim 13 wherein said mounting means comprises a machine bolt having an at least partially threaded shaft, an enlarged head portion at one end and an enlarged nut threaded on the other end and a coil spring encircling said shaft in force transmitting relation to said flat vertical portion of said blade at one end and in force transmitting relation to said enlarged head at the other end, said shaft extending outwardly from said flat vertical portion of said blade, said spring urging said flat vertical portion of said blade against a ring mounting means on the exterior of said drum.

15. A flat L-shaped blade and spring mounting assembly for rotatable drum crop mowers comprising a flat vertical portion and a flat horizontal portion, said flat vertical portion attached in relation to said drum by spring mounting means extending through an oversized hole in said flat vertical portion, horizontal application of force to said flat horizontal portion causing said spring mounting means to flex providing arcuate yielding of said flat horizontal portion and automatic return to its cutting position, vertical application of force to said flat horizontal portion causing said spring mounting means to flex providing vertical yielding of said flat horizontal portion and automatic return to its cutting position.

16. A flat L-shaped blade and spring mounting assembly of claim 15 wherein said flat L-shaped blades are at least ⅛ inch thick and have a ratio of width to thickness of about 3 to 8.

17. A flat L-shaped blade and spring mounting assembly of claim 16 wherein the end portions of said flat horizontal portions of said L-shaped blades are twisted with a sharpened leading edge downward, said end portions twisted about 5 to about 30 degrees relative to said horizontal portions.

18. A flat L-shaped blade, spring mounting means and tunnel assembly for attachment to the drum of a rotatable drum crop mower wherein said flat L-shaped blade is attached by said spring mounting means to the interior of said tunnel; said tunnel comprising a U-shaped structure having outwardly extending flanges at the ends of the legs of said U-shaped structure adapted to be vertically mounted to the exterior of said drum; said spring mounting means comprises a machine bolt having an at least partially threaded shaft, an enlarged head portion at one end and an enlarged nut threaded on the other end, said shaft extending inwardly through a hole in said tunnel, and a coil spring encircling said shaft in force transmitting relation to said flat vertical portion of said blade at one end and in force transmitting relation to said enlarged nut at the other end urging said flat vertical portion of said blade against the interior of said tunnel; and said L-shaped blade comprising a flat vertical portion and a flat horizontal portion, said flat vertical portion attached in relation to said tunnel by said spirng mounting means extending inwardly through an oversized hole in said flat vertical portion whereby horizontal application of force to said flat horizontal portion causes said spring means to flex providing arcuate yielding of said flat horizontal portion from its cutting position and automatic return to its cutting position and whereby vertical application of force to said flat horizontal portion causes said spring means to flex providing vertical yielding of said flat horizontal portion and automatic return to its cutting position.

19. The assembly of claim 18 wherein said flat L-shaped blade is at least ⅛ inch thick and has a ratio of width to thickness of about 3 to 8.

20. The assembly of claim 19 wherein the end portions of said flat horizontal portions of said L-shaped blades are twisted with a sharpened leading edge downward, said end portions twisted about 5 to about 30 degrees relative to said horizontal portions.

* * * * *